(12) United States Patent
Duarte et al.

(10) Patent No.: US 6,903,824 B2
(45) Date of Patent: Jun. 7, 2005

(54) LASER SENSITOMETER (75) Inventors: Francisco J. Duarte, Rochester, NY (US); Brian A. Reed, Rochester, NY (US); Chris J. Burak, Edgewood, NM (US)

(73) Assignee: Eastman Kodak Company, Rochester, NY (US)

( * ) Notice: Subject to any disclaimer, the term of this patent is extended or adjusted under 35 U.S.C. 154(b) by 89 days.

(21) Appl. No.: 10/327,392

(22) Filed: Dec. 20, 2002

(65) Prior Publication Data

US 2004/0119979 A1 Jun. 24, 2004

(51) Int. Cl.[7] .............................................. G01N 21/00
(52) U.S. Cl. ...................................... 356/443; 356/432
(58) Field of Search ........................... 356/237.2–237.5, 356/369, 443, 432

(56) References Cited

U.S. PATENT DOCUMENTS

| 3,677,653 | A |   | 7/1972  | Hocker et al. |         |
|-----------|---|---|---------|---------------|---------|
| 4,891,817 | A |   | 1/1990  | Duarte        |         |
| 5,053,619 | A |   | 10/1991 | Arimoto       |         |
| 5,255,069 | A |   | 10/1993 | Duarte        |         |
| 5,764,363 | A | * | 6/1998  | Ooki et al.   | 356/364 |
| 5,786,911 | A | * | 7/1998  | Tawa et al.   | 359/17  |
| 5,838,239 | A | * | 11/1998 | Stern et al.  | 340/583 |
| 6,236,461 | B1|   | 5/2001  | Duarte        |         |

* cited by examiner

Primary Examiner—Zandra V. Smith
(74) Attorney, Agent, or Firm—Susan L. Parulski (57) ABSTRACT

An optical apparatus. More particularly, a laser sensitometer. The apparatus comprises: a polarized light source adapted to provide a Gaussian beam of light directed along an optical axis; a rotatable polarizer disposed in the optical axis adapted to vary an intensity of the beam of light, the polarizer being rotatable about the optical axis; and a rotatable polygon disposed in the optical axis, the polygon being rotatable about an axis perpendicular to the optical axis.

16 Claims, 11 Drawing Sheets

$$\pi = \eta_{i0} + \phi_{i0} + \phi_{r0} + \eta_{r0} \quad (1)$$

$$\phi_{i0} = \phi_{r0} \quad (2)$$

$$\eta_{i0} = \eta_{r0} \quad (3)$$

$$\pi = \eta_{i0} - \delta + \phi_{i1} + \phi_{r1} + \eta_{r0} - \delta \quad (4)$$

$$\pi = \eta_{i0} - \delta + \phi_{i1} + \phi_{r1} + \eta_{i0} - \delta \quad (5)$$

$$2(\eta_{i0} - \delta) + \phi_{i1} + \phi_{r1} = \phi_{i0} + \phi_{r0} + 2\eta_{i0} \quad (6)$$

$$\phi_{i1} + \phi_{r1} = \phi_{i0} + \phi_{r0} + 2\delta \quad (7)$$

$$(\phi_{i1} + \phi_{r1}) \text{ AND } \delta \text{ ARE A FUNCTION OF TIME} \quad (8)$$

$$(\phi_{i0} + \phi_{r0}) \text{ IS A CONSTANT} \quad (9)$$

$$d(\phi_{i1} + \phi_{r1})/dt \approx 2d\delta/dt \quad (10)$$

$$d(\phi_{i1} + \phi_{r1})/dt \approx 2\omega_0 \quad (11)$$

WHERE $\omega_0$ IS THE ROTATION SPEED OF THE POLYGON $$d(\phi_{i1} + \phi_{r1})/dt \approx 2\omega_0 \quad (12)$$

$$d(\phi_{i2} + \phi_{r2})/dt \approx 4d\delta/dt \quad (13)$$

$$\pi = \eta_{i0} + \phi_{i0} + \phi_{r0} + \eta_{i0} \quad (14)$$

$$\pi = \eta_{i0} - 2\delta + \phi_{i2} + \phi_{r2} + \eta_{i0} - 2\delta \quad (15)$$

$$\phi_{i2} + \phi_{r2} = \phi_{i0} + \phi_{r0} + 4\delta \quad (16)$$

$$d(\phi_{i2} + \phi_{r2})/dt \approx 4d\delta/dt \quad (17)$$

$$d(\phi_{i2} + \phi_{r2})/dt \approx 4\omega_0 \quad (18)$$

LASER SENSITOMETER

FIELD OF THE INVENTION

The invention relates generally to a laser sensitometer, and in particular to a single optical channel laser sensitometer.

BACKGROUND OF THE INVENTION

Sensitometers are well known in the photographic art as an apparatus for generating sensitometric test strips from light-sensitive material (such as photographic paper, film, and the like) to determine the resolution response from the material. A sensitometer generally comprises a light source and means for producing a graded series of exposures (also referred to as line exposures) of the light-sensitive material being tested, such as an optical wedge having a series of steps of known absorbing power.

Some known methods of producing a graded series of exposures (also referred to as line exposures) of the light-sensitive material involve the displacement of a light beam (or laser beam) following reflection on a rotating prism or rotating polygon. A rapid scanning of the light beam caused by the rotating prism or polygon also produces an exposure time. Other known methods vary and control the laser intensity on an exposure using an acousto-optical modulator (AOM).

U.S. Pat. No. 3,677,653 (Hocker) teaches a sensitometer employed to make a sensitometric test strip. U.S. Pat. No. 5,053,519 (Arimoto) relates to an optical system using rotating polygons. U.S. Pat. No. 6,236,461 (Duarte), commonly assigned and incorporated herewith by reference, discloses a laser sensitometer that does not employ an AOM or a rotating prism or polygon. U.S. Pat. No. 5,255,069 (Duarte), commonly assigned and incorporated herewith by reference, discloses an interferometric system for examining and characterizing ultra fine details of various specimens, such as a piece of photographic film.

While such systems may have achieved certain degrees of success in their particular applications, there continues to be a need for a simple, reliable laser sensitometer.

SUMMARY OF THE INVENTION

An object of the present invention is to provide an improved laser sensitometer.

This object is given only by way of illustrative example. Thus, other desirable objectives and advantages inherently achieved by the disclosed invention may occur or become apparent to those skilled in the art. The invention is defined by the appended claims.

According to one aspect of the invention, there is provided an optical apparatus. The apparatus comprises: a polarized light source adapted to provide a Gaussian beam of light directed along an optical axis; a rotatable polarizer disposed in the optical axis adapted to vary an intensity of the beam of light, the polarizer being rotatable about the optical axis; and a rotatable polygon disposed in the optical axis, the polygon being rotatable about an axis perpendicular to the optical axis.

According to another aspect of the invention, there is provided an optical apparatus. The apparatus comprises: a polarized light source adapted to provide a Gaussian beam of light directed along an optical axis; a laser emitting a beam of light having a wavelength different than the beam of light from the light source; a beam splitter disposed in the optical axis to direct the beam of light from the laser along the optical axis; a rotatable polarizer disposed in the optical axis adapted to vary an intensity of the beam of light, the polarizer being rotatable about the optical axis; and a rotatable polygon disposed in the optical axis, the polygon being rotatable about an axis perpendicular to the optical axis.

According to yet another aspect of the invention, there is provided an optical apparatus for exposing a sample of light sensitive material to provide a graded series of exposures of different intensity levels. The apparatus comprises: a light source adapted to provide a polarized Gaussian beam of light directed along an optical axis toward the sample; a rotatable polygon disposed in the optical axis, the polygon being rotatable about an axis perpendicular to the optical axis; a rotatable polarizer disposed in the optical path intermediate the light source and the polygon and adapted to vary an intensity level of the beam of light, the polarizer being rotatable about the optical axis; and a displacement device adapted to displace the sample in a direction transverse to the optical axis.

According to still another aspect of the invention, there is provided a method for exposing a sample of light sensitive material to provide a graded series of exposures of different intensity levels. The method comprises the steps of: (a) generating a polarized Gaussian beam of light directed along an optical axis toward the sample of light sensitive material; (b) directing the polarized beam of light through a polarizer rotating about the optical axis to vary an intensity level of the beam of light; (c) directing the polarized beam of light through a polygon rotating about an axis perpendicular to the optical axis to generate a rotating beam of light; (d) projecting the rotating beam of light on the sample; (e) displacing the sample in a plane transverse to the optical axis; and (f) repeating steps (b) through (e) until an exposure area with a desired dimension is obtained on the sample.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

The following is a detailed description of the preferred embodiments of the invention, reference being made to the drawings in which the same reference numerals identify the same elements of structure in each of the several figures.

Traditionally, multi-wavelength laser sensitometers employ one optical channel for each wavelength. Therefore, a laser sensitometer exposing at three different wavelengths employs three lasers, each laser being the initial state of a separate optical channel. An additional feature of a traditional laser sensitometer is the use of an acousto-optical modulator (AOM) to vary and control the laser power incident on a sample (e.g., imaging material) to be exposed. In addition, scanning of the laser beam is accomplished using opto-mechanical devices such as polygon prisms rotating at high speeds.

The present invention relates to a laser sensitometer that employs a single optical channel, does not employ an AOM, and employs a high speed rotating polygon. The laser sensitometer of the present invention is preferably configured to expose a sample, for example, light sensitive material or other imaging surfaces, to a series of intensity levels and at various wavelengths.

FIRST EMBODIMENT

Figure 1:
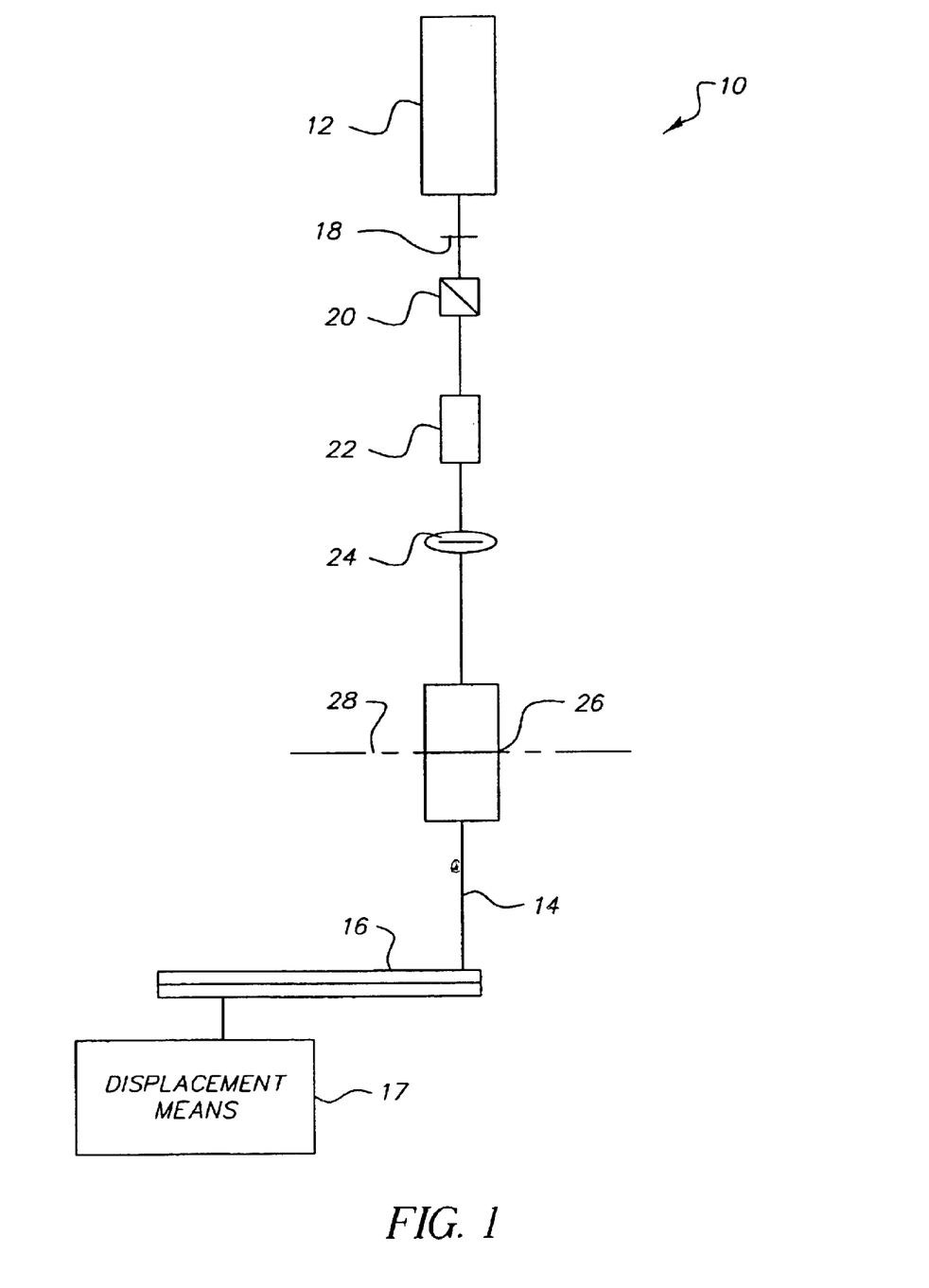
FIG. 1 shows a first embodiment of a laser sensitometer in accordance with the present invention.

FIG. 1 shows a schematic of an optical apparatus in accordance with a first embodiment of the present invention. As illustrated, an optical apparatus 10 comprises a polarized light source 12 adapted to provide a Gaussian beam of light directed along an optical axis 14 toward a sample 16. Sample 16 can be a photographic film, light sensitive material or other imaging surface which generates an intensity profile when exposed to light source 12. Sample 16 is displaceable in a direction transverse to the propagation plane and transverse to the optical axis by displacement means 17 well known to those skilled in the art.

Light source 12 is preferably a laser, and can be a continuous wave laser or a pulsed laser. A suitable pulsed laser yields 500 to 10,000 pulses per second and has a pulse length in at least the 10 to 1000 nano-second range. An example of a suitable light source 12 is a gas or HeNe laser operated in the pulse mode which provides a polarized single transverse mode (TEM00) substantially pure Gaussian beam. Another suitable light source 12 is a diode-pumped frequency-doubled solid-state laser, such as a Nd:YAG laser operated in the pulsed domain emitting some 15 mW at 532 nm in a substantially Gaussian beam.

Optical apparatus 10 further comprises a variable neutral density filter 18 and a rotatable polarizer 20 disposed in optical axis 14. Polarizer 20 is rotatable about optical axis 14 and adapted to vary an intensity of the beam of light. Polarizer 20 is preferably a Glan-Thompson type prism polarizer with a high extinction coefficient of about 1 to about 1×10−6 or better. Rotation of polarizer 20 provides a wide range of intensity levels that, in turn, yields different exposure levels on sample 16. For example, a distinct level of exposure can be provided every 5 degrees, which implies a total of 18 possible exposures. The inclusion of filter 18 provide an additional intensity scale. Polarizer 20 adjusts the intensity of the transmitted beam by rotating to a given angular position.

Optical apparatus 10 further includes a Galilean telescope 22 and a lens 24, both disposed in optical axis 14, wherein telescope 22 is disposed intermediate polarizer 20 lens 24. Lens 24 is preferably a convex focusing lens 24 having an f value of approximately 50 cm.

Optical apparatus 10 further includes a rotatable polygon 26 disposed in optical axis 14 intermediate lens 24 and sample 16. Polygon 26 is configured to be rotatable about an axis 28 perpendicular to the plane of propagation (i.e., perpendicular to optical axis 14). Adjusting the radius of rotation provides for the adjustment of the linear speed of light source 12 on sample 16.

The employment of the polarizer 18 provides for the non-usage of the AOM. The present invention exploits the technical feature of laser emissions from lasers being substantially nearly 100% linearly polarized. As such, polarizer 18 can adjust the intensity of the transmitted beam by rotating to a particular angular position. Polarizer 18 used in Applicant's particular experiments has an extinction ratio of approximately 1×10$^5$. That is, the laser emission polarized perpendicular to the plane of propagation can be attenuated by 10$^5$.

In a preferred embodiment, polygon 26 is configured as a hexagon. Polygon 26 is more particularly described below.

SECOND EMBODIMENT

Figure 2:
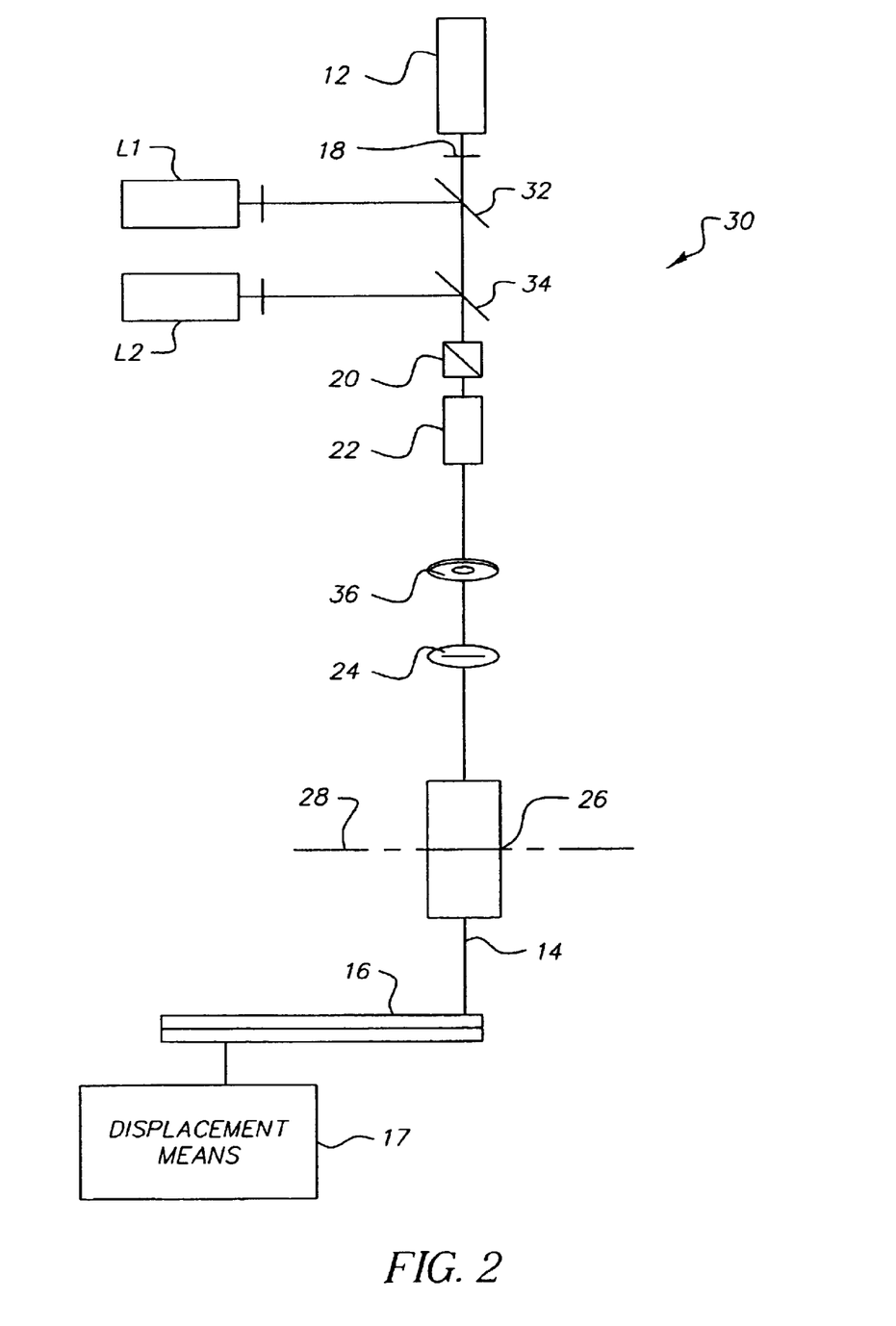
FIG. 2 shows a second embodiment of a laser sensitometer in accordance with the present invention.
Figure 3A:
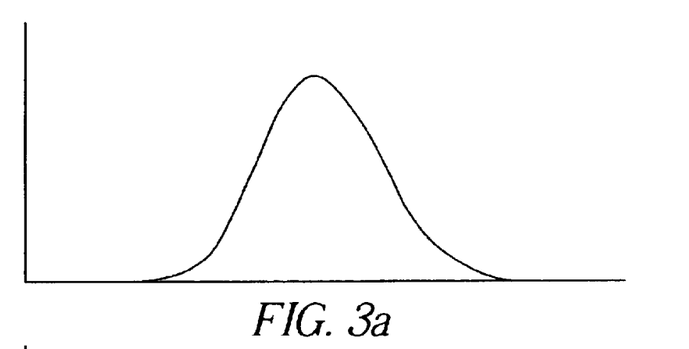
FIGS. 3a–3d show TEM00 laser beam profiles, corresponding to, respectively, a λ=480 nm laser, a λ=532 nm laser, a λ=690 nm laser, and to the three lasers combined.
Figure 3B:
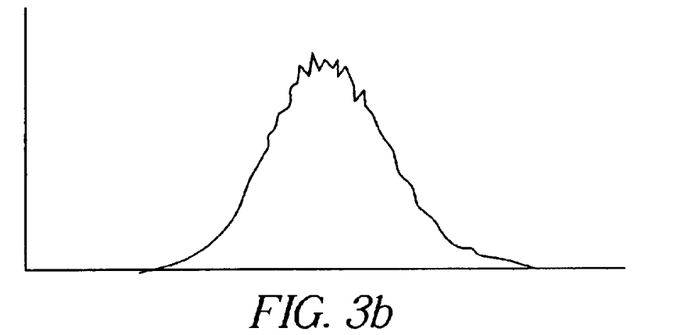
Figure 3C:
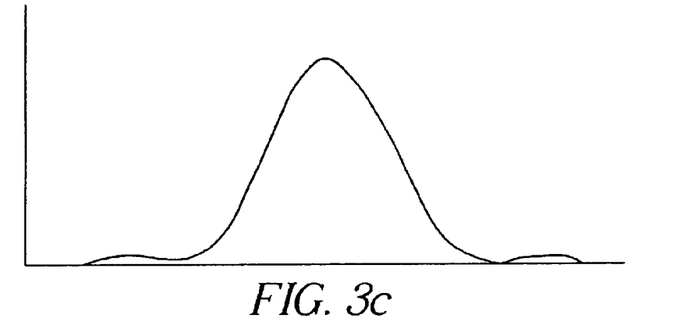
Figure 3D:
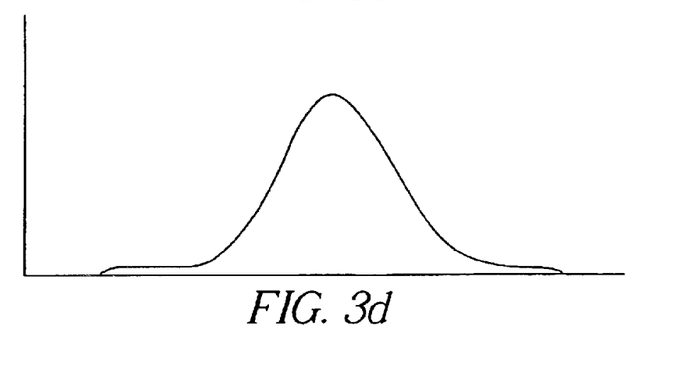

The optical apparatus of FIG. 1 can include at least one laser emitting a beam of light having a wavelength different from the beam of light from light source 12. FIG. 2 shows such an optical apparatus 30. As illustrated, optical apparatus 30 includes a plurality of lasers, wherein L1 and L2 are shown in FIG. 2. Each laser L1,L2 emits a beam of light having a wavelength different than the beam of light from light source 12.

Optical apparatus 30 includes a beam splitter 32,34 for each of the plurality of laser L1,L2, respectively, a beam splitter disposed in optical axis 14 to direct the beam of light from the laser along optical axis 14. Similar to optical apparatus 10 shown in FIG. 1, optical apparatus 30 includes filter 18, polarizer 20, telescope 22, and rotating polygon 26 rotatable about axis 28.

Optical apparatus 30 further includes an aperture 36 disposed in optical axis 14 intermediate polarizer 20 and polygon 26 to provide a symmetric beam of light. More particularly, aperture 36 is employed to affect the diameter of one of the beams, by means of diffraction, incident on sample 16.

The laser sensitometer of the present invention provides for the variation and adjustment of laser power, laser beam dimension, and exposure times to meet a range of performance requirements. In addition, the use of a single optical channel provides for a reduction in cost, time, and complexity. Further, the AOM is replaced by a single passive optical component, which eliminates the need and requirement for sophisticated computer software control. Still further, the laser sensitometer of the present invention provides multi-wavelength exposure times in the 20 nano-second range.

EXAMPLE

An example is now provided.

A large number of lasers can be employed, though for Applicant's particular application, a three laser scheme was employed. A red laser, entering by means of one of the beam splitters, can be a semiconductor laser emitting about 30 mW at 690 mn. Although such a laser is TEM00, it is characterized by a 2:1 beam elongation perpendicular to the plane of propagation. As such, it requires prismatic beam expansion (not shown) to yield a circular beam. A blue laser is an Ar+ laser yielding about 20 mW at 480 nm. Further, it employs a polarization rotator (not shown) in the schematics. This laser can be employed in the absence of a variant of the frequency-doubled diode-pumped Nd:YAG laser emitting at 477 nm.

The lasers are matched to yield a near-Gaussian beam with an approximate 80 μm beam waist directed on sample 16. For Applicant's particular application, the variation from laser to laser was less than a few μm, although Applicant recognized that the lasers can be substantially matched with careful alignment. The three lasers were configured to irradiate simultaneously sample 16, with the combined beam waist being still being approximately 80 μm. FIGS. 3a–3d show the TEM00 laser beam profiles, wherein FIG. 3a corresponds to a λ=480 nm laser, FIG. 3b corresponds to a λ=532 nm laser, FIG. 3c corresponds to a λ=690 nm laser, and FIG. 3d corresponds to the three lasers combined.

Figure 4:
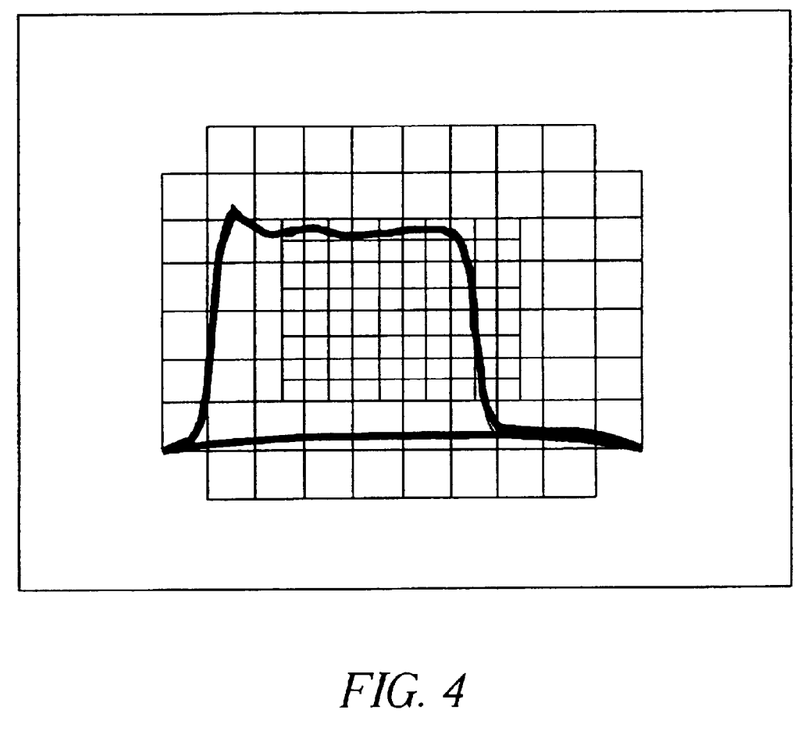
FIG. 4 shows a temporal pulse for a 1 mm travel distance.

Using formulas, the rotational and linear velocity of the laser beam in a double-pass reflection configuration can be determined. These calculations were matched with nanosecond measurements using a high-speed Hamamatsu phototube (R1193U) and a 7834 Tektronix storage oscilloscope. This measurement technique was used to determine the linear speed of the laser beam. For example, referring to FIG. 4, the time pulse caused by the displacement of 1 mm by an 80 μm laser beam is shown. The overall time is measured to be 275 ns. This yields a time of 22 nanoseconds to traverse a distance of 80 μm. Careful adjustment to the radius of rotation lead to exposures in the 20 to 30 nanosecond domain.

Polarizer 20 was housed in a RV80CC Newport annular rotating stage adapted for a 0.001 arc second angular resolution. Polarizer 20 was controlled by a MM3000 processing unit. Since the relation between the angular position of polarizer 20 and intensity if not linear, laser power measurements were performed to derive a 0.15 log intensity difference between the two angular positions.

It is noted that the high precision rotation state of polarizer 20 is not required, and a considerably less expensive alternative can be employed.

Displacement means 17 was performed by an Aerotech stage controlled by a Unidex511 unit. A typical program for displacement means 17 directed sample 16 to translate 15 mm and then wait 10 second before moving again. This translate/wait step was repeated 11 times.

Once synchronized, the rotation of polarizer 20 and translation of sample 16 by displacement means 17 produced a series of line exposures corresponding to the 80 μm laser beam. This series of line exposures are produced by the motion of the laser beam. Since sample 16 moves transversely to the motion of the laser beam, a series of line exposures at a predetermined intensity level is generated. Then, the laser intensity transmitted to sample 16 is changed such that a new series of line exposures with a 0.15 log intensity difference is generated. This process is repeated numerous times so that a series of exposed areas with a 0.15 log intensity difference is produced.

As indicated above, the rotation of the laser beam is performed by polygon 26. For this example, polygon 26 was configured as a hexagon, as will be more particularly described below.

Figure 5A:
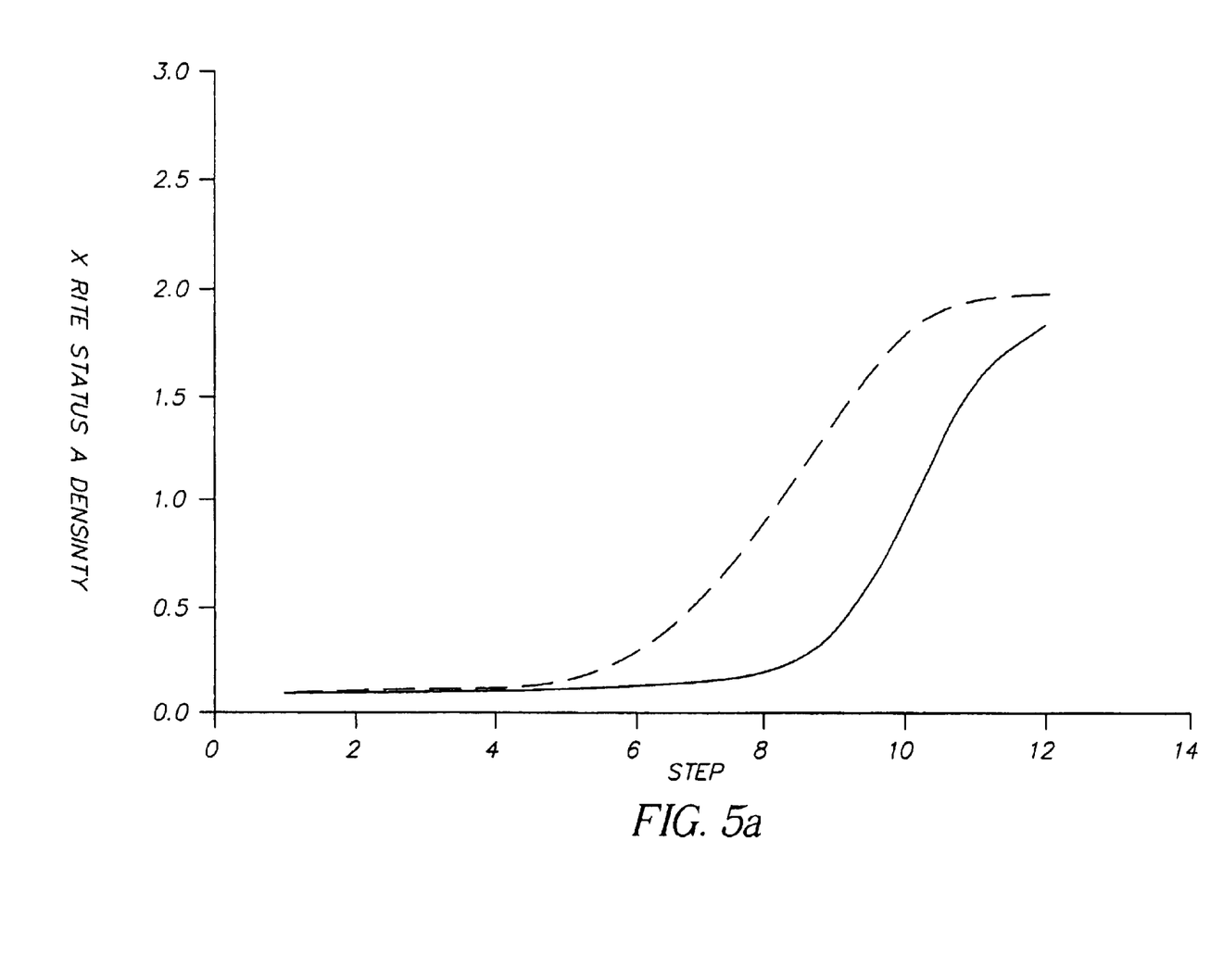
FIGS. 5a–5c show densitometry curves comparing two different photographic papers, for respectively, λ=480, λ=532 nm, and λ=690 nm.
Figure 5B:
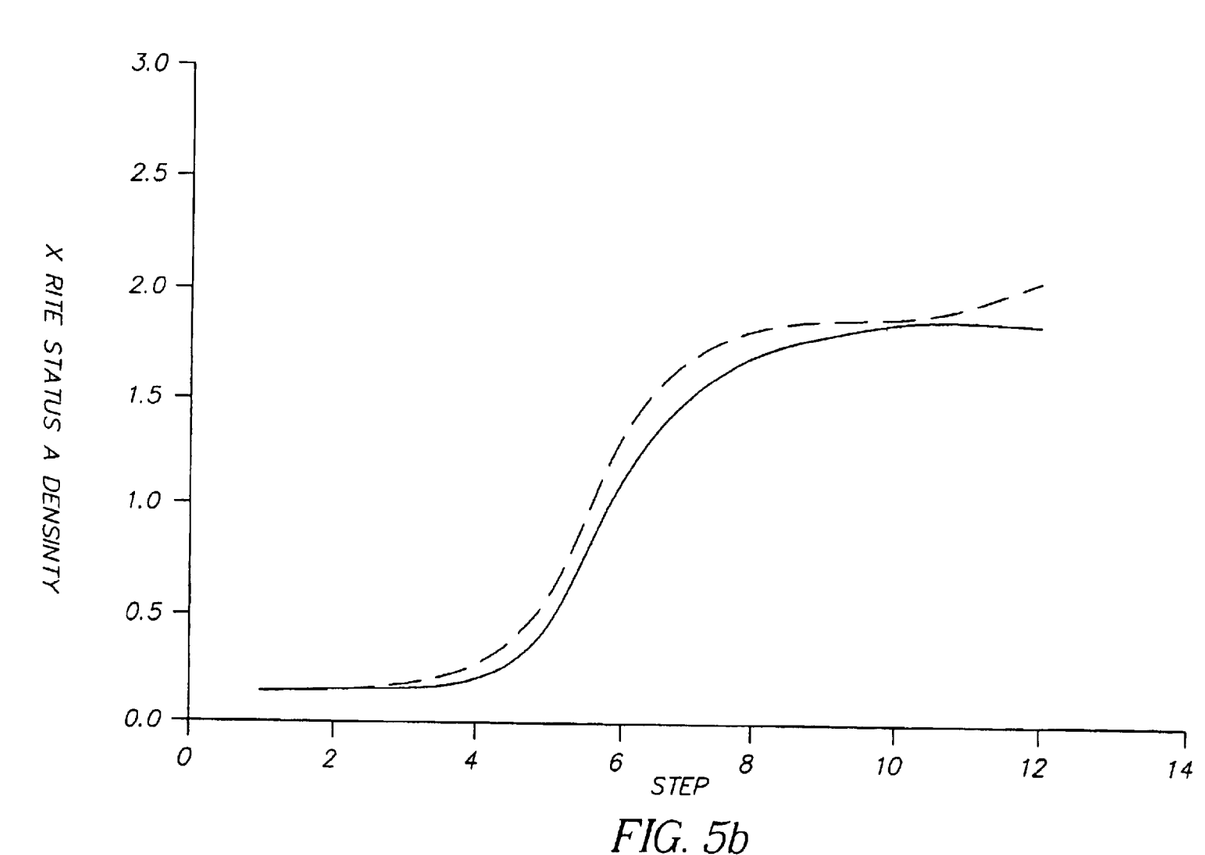
Figure 5C:
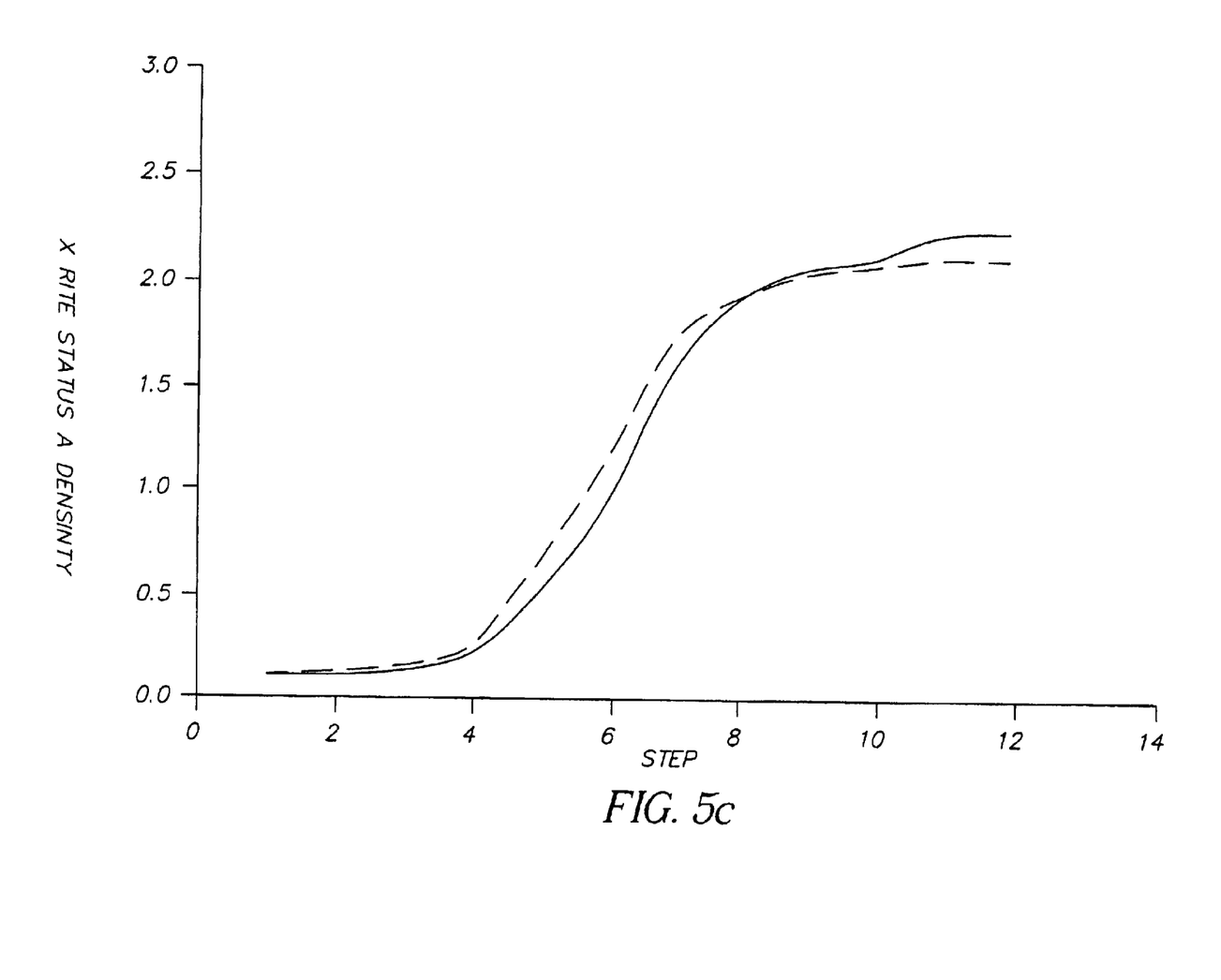

For this particular example, the optical apparatus 30 yielded a series of exposures at 480 nm, 532 nm, and 690 nm. Using the lasers, the maximum power available on sample 16 is 10 mW (at λ=480), 3 mW (λ=532 nm), and 7 mW (at λ=690 nm). These powers were sufficient for Applicant to obtain greater than 2 log exposures on color paper. Densitometry curves comparing two different photographic papers, for exposure times of 26 nanoseconds, are shown in FIGS. 5a through 5c, for respectively, λ=480, λ=532 nm, and λ=690 nm.

The present invention provides a flexible optical apparatus adapted to meet special exposure requirements. For example, laser power, laser beam dimensions, and exposure times can be varied and adjusted to adapt to a wide range of performance requirements.

Several advantages are provided by the present invention. For example, use of a single optical channel reduces cost, time, and complexity of laser sensitometers. In addition, it eliminates the need of separate optical channels and use of AOMs. The elimination of the AOM reduces the need for complex computer control software. Further, it provides multi-wavelength exposure times in the 20 ns range.

Polygon. Polygon 26 is now more particularly described.

Any given polygon has two adjacent surfaces. It can have an hexagonal, pentagonal, or other geometry. For Applicant's application, it has been advantageous to minimize the extent of the intrinsic first surface angular speed. This is 120 degrees for a hexagon and 144 degrees for a pentagon. As such, a polygon with as many surfaces as possible is desired. Yet, the increment of surfaces increases the duty cycle of the scanning. As such, a hexagonal shape was employed.

For a light beam incident on an optical surface, it is well known that the angle of incidence is equal to the angle of reflection, that is:

$$\phi_i = \phi_r$$

Figure 6:
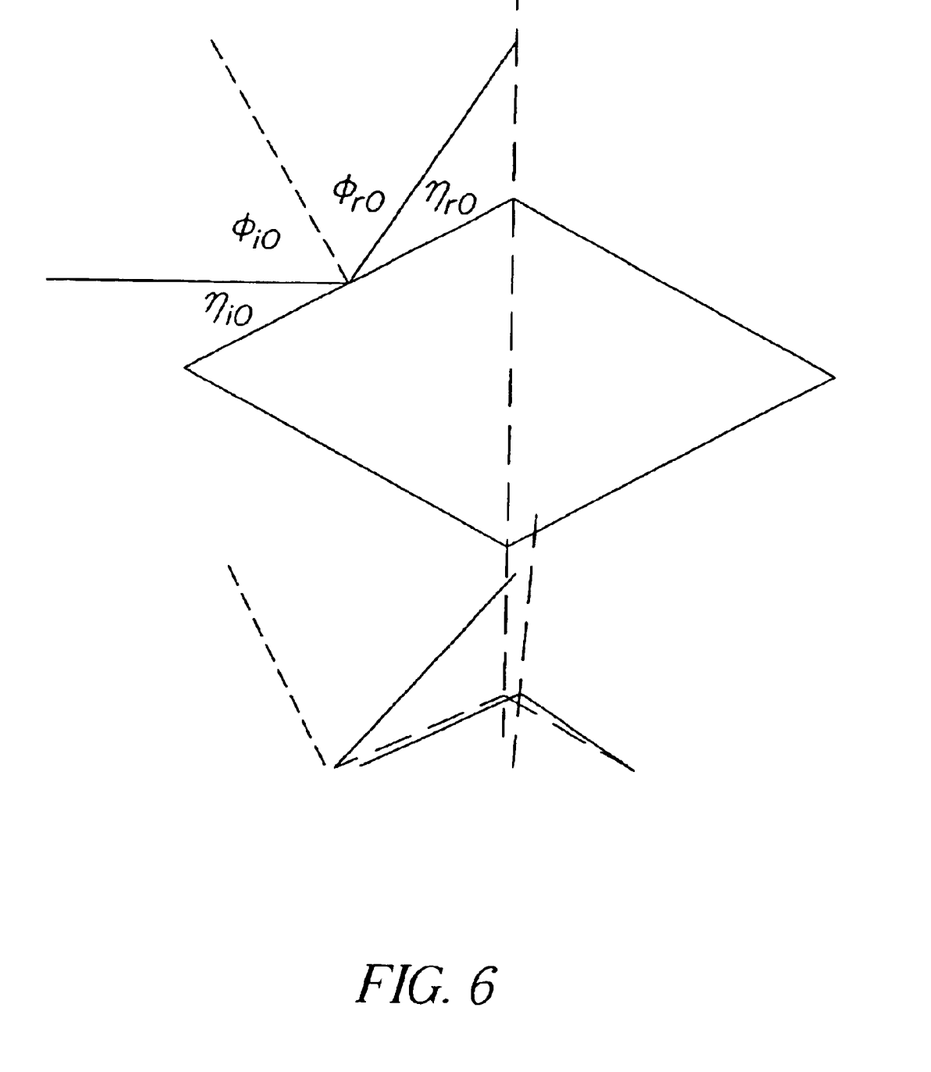
FIG. 6 shows a representation of an upper portion of a polygon in accordance with the present invention.

FIG. 6 provides a representation of an upper portion of polygon 26. A laser beam, at t=0, at an incident reference position on one of the reflection surface of the polygon shown in FIG. 6 responds according to Equations 1–3 of FIG. 7, wherein $\phi_{i0}$ and $\phi_{r0}$ are defined according to convention relative to the normal to the reflection surface.

If the radius of the polygon rotations by an angle δ, then the external surface of that polygon also sustains an angle relative to the rest position (at t=0) of that surface. If the radius of a polygon is rotated clockwise by an angle δ then the angle of incidence with increase by δ. Since the angle of incidence is increased by δ then the angle of reflection is also increased by δ. In other words, by geometrical construction, it can be shown that if the radius of the polygon rotates by an angle δ then the sum of the incidence and the reflection angles increases by 2δ.

Figure 7:
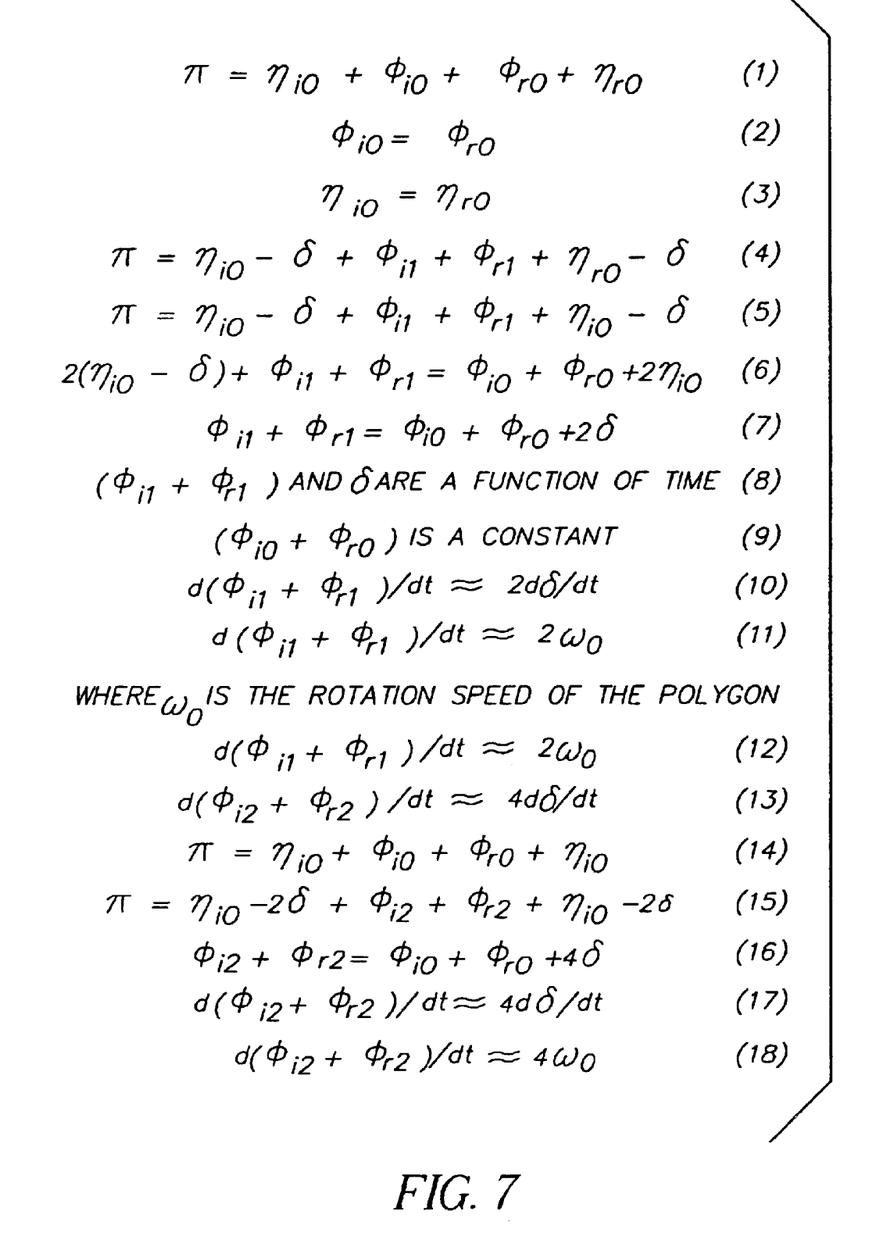
FIG. 7 shows a plurality of equations describing the operation of the polygon in accordance with the present invention.
Figure 8:
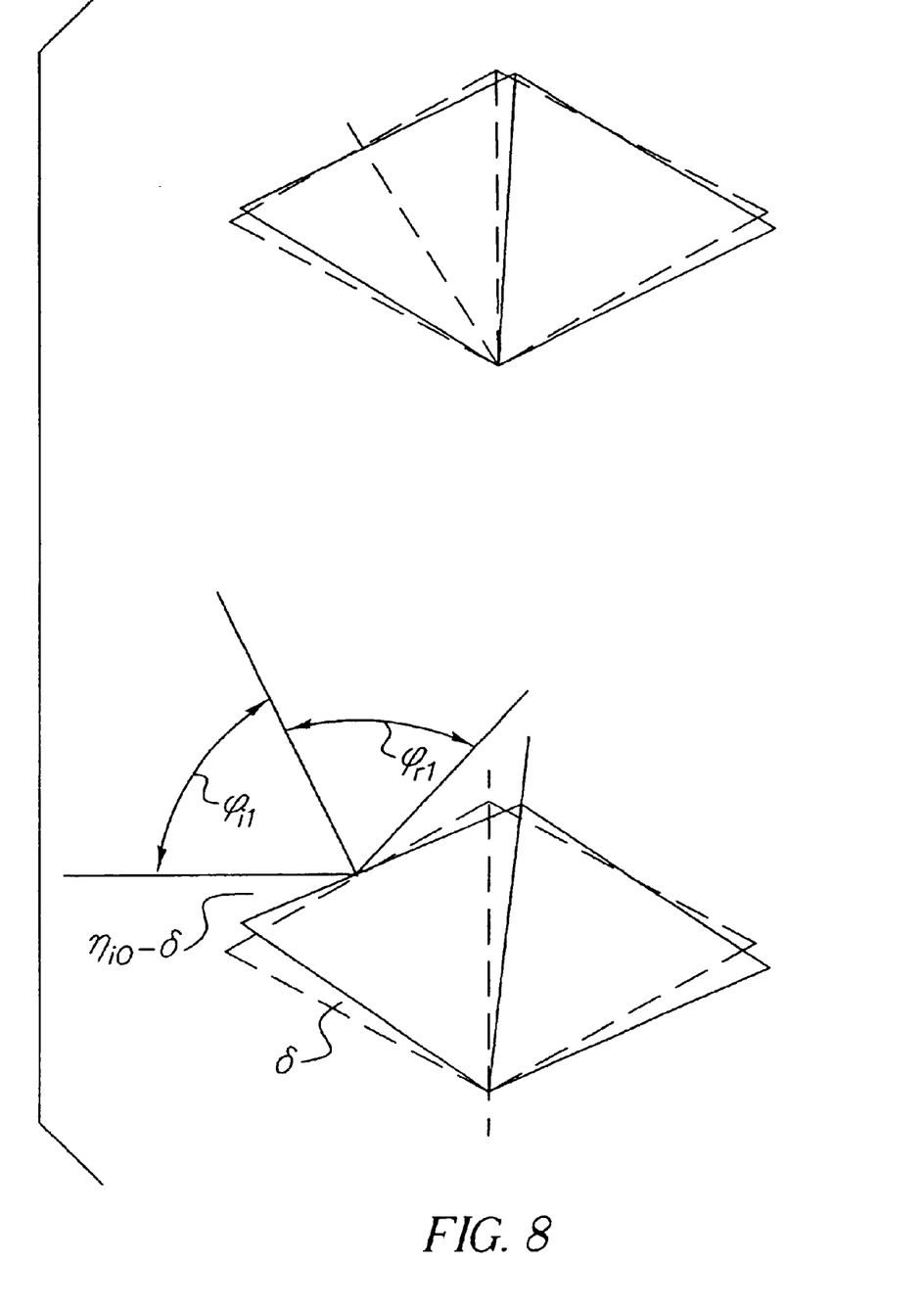
FIG. 8 shows a representation of a polygon rotated infinitesimally from the position shown in FIG. 6.

Following a rotation of the polygon by infinitesimal δ radians at an infinitesimal time later, then the polygon shown in FIG. 8 responds according to Equations 4–11 of FIG. 7.

For a sufficiently large radius, relative to the dimensions of the polygon, a light rotator with the cross sections of the light, or laser, beam is moving at the speed of Equation 12.

Figure 9:
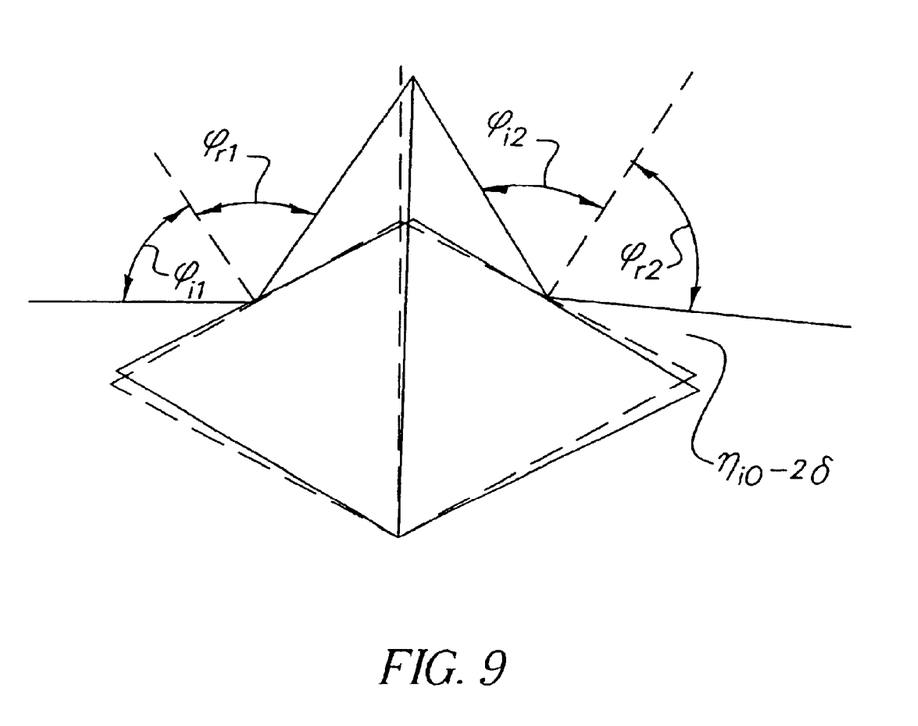
FIG. 9 shows reflecting back to the adjacent surface the beam first reflected from the incident surface.

Consideration is now directed to reflecting back to the adjacent surface the beam first reflected from the incident surface at $(\phi_{i1}+\phi_{r1})$ as shown in FIG. 9. In this situation, there is a contribution from the rotation of the polygon of 2δ. However, since the reflected beam at the mirror also undergoes a 2δ deviation (induced in the first reflection), the polygon responds according to Equation 13 of FIG. 7.

Alternatively, by geometrical construction, it is observed that the angular deviation at the second polygon face is 2δ for the incidence beam and 2δ for the reflection beam, so that Equations 14–17 are fulfilled. Thus, this second, or double-pass, reflection causes the laser beam to rotate at an angular speed shown in Equation 18.

By symmetry, it can be established that if for a first reflection, a rotational speed of the reflected beam of $2\omega_0$ is achieved, and for a second reflection a $4\omega_0$ rotational speed is achieved, then a third reflection would yield $8\omega_0$. In other words, the rotational speed of the reflected beam increases according to $2^N\omega_0$, where N is the number of reflections. For Applicant's particular example, a 80 μm laser Gaussian beam was measured to travel 1100 μm in 275 ns. This yields a linear speed of about 4000 m/s. For a radius of $(1/\pi)$m, this means a rotational speed of ω of about 4000 π rads/sec, which should be compared with the rotational speed of the polygon, which is rated at $\omega_0$ of about 1000 π rads/sec. This indicates that the laser spot moves to a new position in 20 ns, which is known as the "exposure" time. As such, the laser sensitometer of the present invention includes a polygon rotatable at a speed of about 1000 π radians/second, which in a double-pass reflection configuration, causes the laser beam (at the focal plane) to move at a linear speed of about 4000 m/s.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

L1, L2 laser
10 optical apparatus
12 light source
14 optical axis
16 sample
17 displacement means
18 filter
20 polarizer
22 telescope
24 lens
26 polygon
28 axis
30 optical apparatus
32 beam splitter
34 beam splitter
36 aperture

What is claimed is:

1. An optical apparatus, comprising:
   a polarized light source adapted to provide a Gaussian beam of light directed along an optical axis;
   a rotatable polarizer disposed in the optical axis adapted to continuously vary an intensity of the beam of light, the polarizer being rotatable about the optical axis; and
   a rotatable polygon disposed in the optical axis, the polygon being rotatable about an axis perpendicular to the optical axis.

2. The optical apparatus of claim 1, wherein the light source is a continuous wave laser or a pulsed laser.

3. The optical apparatus of claim 1, wherein the polygon comprises a hexagon.

4. The optical apparatus of claim 1, wherein the polygon rotates at a speed of about 1000 π radians/second whereby the beam of light moves at a linear speed of about 4000 m/s.

5. The optical apparatus of claim 1, wherein the beam of light is projected along the optical axis toward a sample, and the optical apparatus further comprises a displacement system for displacing the sample in a direction transverse to the optical axis.

6. The optical apparatus of claim 1, further comprising a filter disposed in the optical axis.

7. The optical apparatus of claim 1, wherein the polarizer is a Glan-Thompson polarizer.

8. An optical apparatus, comprising:
   a polarized light source adapted to provide a Gaussian beam of light directed along an ontical axis;
   a rotatable polarizer disposed in the optical axis adapted to vary an intensity of the beam of light, the polarizer being rotatable about the optical axis;
   a rotatable polygon disposed in the optical axis, the polygon being rotatable about an axis perpendicular to the optical axis; and
   beam shaping optics comprising a telescope and a convex lens.

9. The optical apparatus of claim 8, wherein the convex lens is disposed in the optical axis intermediate the telescope and the polygon.

10. An optical apparatus, comprising:
    a polarized light source adapted to provide a Gaussian beam of light directed along an optical axis;
    a laser emitting a beam of light having a wavelength different than the beam of light from the light source;
    a beam splitter disposed in the optical axis to direct the beam of light from the laser along the optical axis;
    a rotatable polarizer disposed in the optical axis adapted to vary an intensity of the beam of light, the polarizer being rotatable about the optical axis; and
    a rotatable polygon disposed in the optical axis, the polygon being rotatable about an axis perpendicular to the optical axis.

11. The optical apparatus of claim 10, further comprising a plurality of lasers wherein each laser emits a beam of light, the light source and each laser emitting a beam of light having a different wavelength.

12. The optical apparatus of claim 11, further comprising an aperture disposed in the optical axis intermediate the polarizer and polygon to provide a symmetric beam of light.

13. The optical apparatus of claim 10, wherein the polygon rotates at a speed of about 1000 π radians/second whereby the beam of light moves at a linear speed of about 4000 m/s.

14. An optical apparatus for exposing a sample of light sensitive material to provide a graded series of exposures of different intensity levels, comprising;
    a light source adapted to provide a polarized Gaussian beam of light directed along an optical axis toward the sample;
    a rotatable polygon disposed in the optical axis, the polygon being rotatable about an axis perpendicular to the optical axis;
    a rotatable polarizer disposed in the optical path intermediate the light source and the polygon and adapted to vary an intensity level of the beam of light, the polarizer being rotatable about the optical axis; and
    a displacement device adapted to displace the sample in a direction transverse to the optical axis.

15. A method for exposing a sample of light sensitive material to provide a graded series of exposures of different intensity levels, the method comprising the steps of:
    (a) generating a polarized Gaussian beam of light directed along an optical axis toward the sample of light sensitive material;

(b) directing the polarized beam of light through a polarizer rotating about the optical axis to vary an intensity level of the beam of light;

(c) directing the polarized beam of light through a polygon rotating about an axis perpendicular to the optical axis to generate a rotating beam of light;

(d) projecting the rotating beam of light on the sample;

(e) displacing the sample in a plane transverse to the optical axis; and (f) repeating steps (b) through (e) until an exposure area with a desired dimension is obtained on the sample.

16. The method of claim 15, further comprising the step of rotating the polygon at a speed of about $\omega = 1000\ \pi$ radians/second whereby the beam of light moves at a linear speed of about 4000 m/s.

* * * * *